United States Patent
Rothenberger et al.

(10) Patent No.: US 9,658,737 B2
(45) Date of Patent: May 23, 2017

(54) CROSS PLATFORM SHARING OF USER-GENERATED CONTENT

(71) Applicant: Disney Enterprises, Inc., Burbank, CA (US)

(72) Inventors: Ryan Rothenberger, Valencia, CA (US); Joel Barber, Salt Lake City, UT (US); Seth A. Behunin, West Jordan, UT (US); Hushel Roberts, Salt Lake City, UT (US); Jose Villeta, Playa Vista, CA (US)

(73) Assignee: Disney Enterprises, Inc., Burbank, CA (US)

( * ) Notice: Subject to any disclaimer, the term of this patent is extended or adjusted under 35 U.S.C. 154(b) by 352 days.

(21) Appl. No.: 14/085,640

(22) Filed: Nov. 20, 2013

(65) Prior Publication Data

US 2015/0052458 A1 Feb. 19, 2015

Related U.S. Application Data

(60) Provisional application No. 61/866,984, filed on Aug. 16, 2013.

(51) Int. Cl.
*G06F 15/16* (2006.01)
*G06F 3/0481* (2013.01)
(Continued)

(52) U.S. Cl.
CPC .......... *G06F 3/04815* (2013.01); *G06F 3/011* (2013.01); *G06F 9/541* (2013.01);
(Continued)

(58) Field of Classification Search
CPC ...... G06F 3/04815; G06F 9/541; G06F 3/011; H04L 65/4015; H04L 65/1066; H04L 12/1813
See application file for complete search history.

(56) References Cited

U.S. PATENT DOCUMENTS 7,016,963 B1 * 3/2006 Judd ................. G06F 17/30905
707/E17.121
2010/0017728 A1 * 1/2010 Cho ........................ G06Q 50/00
715/757

(Continued)

FOREIGN PATENT DOCUMENTS

CN 102855209 1/2013
WO 2013086663 A1 6/2013

*Primary Examiner* — Mohamed Ibrahim
(74) *Attorney, Agent, or Firm* — Sheppard Mullin Richter & Hampton LLP

(57) ABSTRACT

Systems and methods for cross platform sharing of user-generated content. The system may comprise a first user device of a first platform type including one or more processors configured to execute computer program modules. A space module may be configured to effectuate display of a virtual space on the first user device and facilitate interaction of a user of the first user device with the virtual space. A content creation module may be configured to configure user-generated virtual space content in the virtual space to be experienced by the user in the virtual space on the first user device. A share module may be configured to convert the user-generated virtual space content to sharable virtual space content. A communications module may be configured to transmit the sharable virtual space content from the first user device to a remote server.

20 Claims, 3 Drawing Sheets

(51) Int. Cl.
  *H04L 29/06* (2006.01)
  *G06F 3/01* (2006.01)
  *G06F 9/54* (2006.01)
  *H04L 12/18* (2006.01)

(52) U.S. Cl.
  CPC ...... *H04L 65/1066* (2013.01); *H04L 65/4015* (2013.01); *H04L 12/1813* (2013.01)

(56) References Cited

U.S. PATENT DOCUMENTS

| | | |
|---|---|---|
| 2011/0131226 A1 | 6/2011 | Chandra |
| 2011/0136577 A1* | 6/2011 | Dietz ............... A63F 13/12 463/43 |
| 2012/0260195 A1 | 10/2012 | Hon |
| 2013/0132477 A1* | 5/2013 | Bosworth ............ G06Q 50/01 709/204 |
| 2013/0346453 A1* | 12/2013 | Procopio ........ G06F 17/30292 707/809 |
| 2014/0315639 A1* | 10/2014 | Cao ..................... A63F 13/12 463/31 |

* cited by examiner

CROSS PLATFORM SHARING OF USER-GENERATED CONTENT

FIELD OF THE DISCLOSURE

This disclosure relates to systems and methods for sharing user-generated content of virtual spaces, and more particularly to sharing user-generated content across different computing platforms.

BACKGROUND

User devices, such as those configured to access virtual spaces, may differ in that they operate on different computing platform types. For example, user devices employed for gaming may operate on different computing platform types. Computing platform types for gaming may include, for example, XBOX, PLAYSTATION, Wii, PC, MAC, iOS mobile devices, Android devices, tablets, mobile device, browser based gaming platforms, and other platform types. User devices configured to access virtual spaces may include, for example, XBOX 360 of the XBOX computing platform type, XBOX ONE of the XBOX computing platform type, PLAYSTATION 3 of the PLAYSTATION computing platform type, PLAYSTATION 4 of the PLAYSTATION computing platform type, Wii U of the Wii computing platform type, a smart TV of the browser based computing platform type, and/or other user devices configured to access virtual spaces.

SUMMARY

One aspect of the disclosure relates to a system for sharing user-generated content between users of a virtual space. The system may be configured such that the user-generated content may be shared across user devices of different platform types. The system may comprise a first user device of a first platform type, and/or other user devices. The first user device may include one or more processors configured to execute computer program modules. The computer program modules may comprise a space module, a content creation module, a share module, a communications module, and/or other modules.

The space module may be configured to effectuate display of a virtual space on the first user device. The space module may be configured to facilitate interaction of a user of the first user device with the virtual space.

The content creation module may be configured to receive entry and/or selection of commands from the user to configure corresponding user-generated virtual space content in the virtual space to be experienced by the user in the virtual space on the first user device.

The share module may be configured to convert the user-generated virtual space content configured on the first user device to sharable virtual space content. The sharable virtual space content may be readable to implement the user-generated virtual space content on a second user device of a second platform type. The second platform type may be different than the first platform type of the first user device.

The communications module may be configured to transmit the sharable virtual space content from the first user device to a remote server. The remote server may be a game server.

Another aspect of the disclosure relates to a method for sharing user-generated content between users of a virtual space. The method may facilitate cross platform sharing of the user-generated content. The method may be implemented on a user device including one or more physical processors and storage media storing machine-readable instructions. The method may comprise the operations of: effectuating display of a virtual space on a user device, and facilitating interaction of a user of the user device with the virtual space; receiving entry and/or selection of commands from the user to configure corresponding user-generated virtual space content in the virtual space to be experienced by the user in the virtual space on the user device; converting the user-generated virtual space content configured on the user device to sharable virtual space content, wherein the sharable virtual space content is readable to implement the user-generated virtual space content on other user devices of platform type different than the platform type of the user device; transmitting the sharable virtual space content from the user device to a remote server, and/or other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
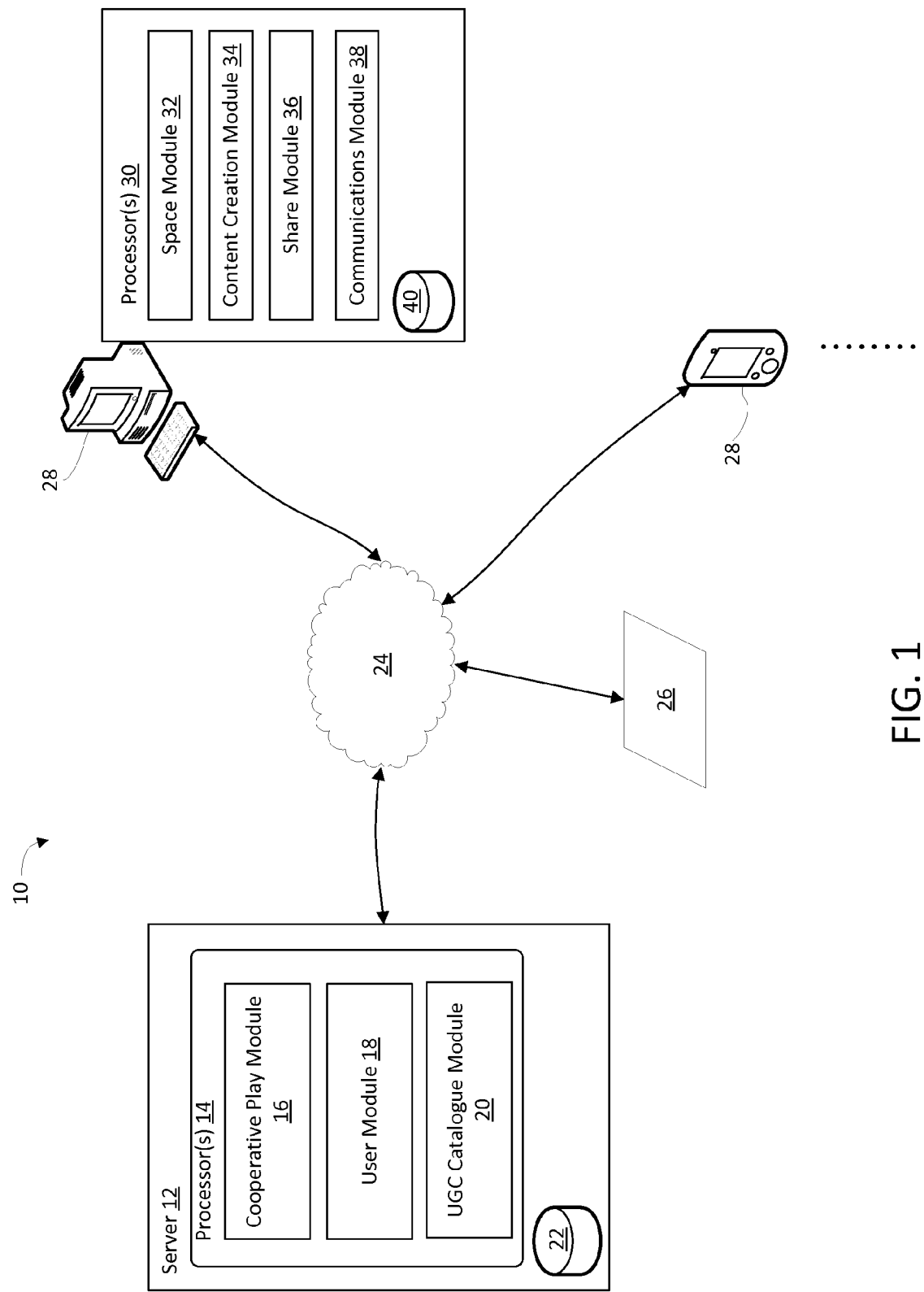
FIG. 1 illustrates a system for sharing user-generated content between computing platforms employed by users of a virtual space.

FIG. 1 illustrates a system 10 configured to facilitate sharing of user-generated content between user devices 28 of different platform types. The user devices 28 may be used to access virtual spaces. The user devices 28 may be employed to create virtual space content (e.g., user-generated content) such that the users may generate customized virtual spaces configured for user implementation on their respective user devices 28. The user-generated content may include, for example, one or more of a game, a scene, a virtual building (or buildings), a virtual object, and/or other user-generated content. User-generated virtual space content created on a particular user device 28 may be of a format which is implementable only on user devices 28 of the same platform type. The system 10 herein may be configured to facilitate the conversion of user-generated content created on user devices 28 of a first platform type to sharable virtual space content. The sharable virtual space content may be a generic and/or open format, such as the ones discussed herein without limitation. The sharable virtual space content may be communicated to other user devices 28 of other platform types. The sharable virtual space content may be communicated to through a network, such as the Internet. The user devices 28 of platform types different than those employed to create the user-generated content may use the sharable virtual space content to implement the corresponding user-generated content to facilitate participation of the users in the shared user-generated content. Such implementation may include converting the sharable virtual space content to a format which is readable by the platform type of the user device 28 making the implementation.

A virtual space may include virtual space content. Virtual space content may include virtual objects which are arranged within the virtual space in a specific manner and/or by other considerations. Virtual objects may include one or more of virtual buildings, vehicles, characters, and/or other topographical elements which are capable of interaction with the users of the virtual space. For example, in some implementations the virtual objects may be arranged in manner to depict a virtual environment. A virtual environment may be, for example, a virtual world, city, raceway, and/or other environment. A virtual environment may include buildings which the users can enter while interacting in the virtual space. A virtual environment may include other virtual objects and/or features.

In some implementations, virtual space content may include artificial intelligence (AI) controlled objects, systems, and/or elements. AI controlled objects may refer to virtual objects within the virtual space which follow predetermined and/or random paths, perform predetermined and/or random actions, and/or other considerations. AI controlled virtual objects may be virtual objects configured to interact with users in the virtual space. For example the virtual space may include AI controlled virtual characters. AI controlled virtual characters may travel along paths within a virtual environment represented in the virtual space. Users may be able to interact with the AI controlled virtual characters within the virtual space according to predetermined and/or random interactions. AI control systems may refer to a collection of AI controlled objects and/or elements. AI control object, systems, and/or elements may be considered in other ways.

In some implementations a virtual space may include virtual space content including one or more games which are available to be played in the virtual space. Games may include online games, multi-player games, mini games, bonus games, solo games, campaign games, skills games, games of changes, and/or other games. The games may comprise a simulated environment. The simulated environment may have a topography, express ongoing real-time interaction by one or more users, and/or may include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the environment. In some instances, the topography may describe a volume with one or more bodies positioned therein (e.g., a simulation of gravity-deprived environment with one or more celestial bodies positioned therein.

In some implementations, virtual space content may comprise game metrics and/or logic associated with the one or more games and/or with the virtual space in general. Game metrics may correspond to the arrangement and/or positioning of virtual objects within the simulated environment of the game and/or other implementation of the virtual space. For example, the game may be a racing game, and virtual objects may comprise portions of a road which define a race track. Game metrics may correspond to a path which the portions of the road follow to describe a lap of the track. Arrangement of virtual object within the virtual space may be considered in other ways.

Game metrics and/or logic may correspond to one or more game rules associated with a game, and/or other logic associated with user interaction within the virtual space. Rules may describe and/or restrict the manner in which gameplay may commence while interacting with the game. Game rules may include for example, the designation of where a lap starts and/or ends on a race track, the amount of laps needed to be completed to win a race, the number of players who can race on the track at a given time, and/or other rule considerations associated with gameplay. Game metrics corresponding to gameplay rules may be considered in other ways. Game logic may be considered in other ways.

In some implementations, the user devices 28 may be of different platforms types. Platform types may include gaming platform types. Gaming platform types may include, for example, XBOX, PLAYSTATION, Wii, PC, MAC, iOS mobile devices, Android devices, tablets, mobile device (e.g., cell phones, smartphones, etc.), browser based gaming platforms, and other platform type. In some implementations, the user devices 28 may include XBOX 360 of the XBOX platform type, XBOX ONE of the XBOX platform type, PLAYSTATION 3 of the PLAYSTATION platform type, PLAYSTATION 4 of the PLAYSTATION platform type, Wii U of the Wii platform type, a smart TV of the browser based gaming platform type, and/or other user devices 28 configured to carry out the various features of the invention described herein. In some implementations, user devices 28 may be devices capable of network communications. In some implementations, user devices 28 may include internet connected devices.

The user devices 28 may include one or more processors 30 configured to execute one or more computer program modules. The computer program modules may include one or more of a space module 32, a content creation module 34, a share module 36, a communications module 38, and/or other modules.

The space module 32 may be configured to implement the instance of the virtual space executed locally on the user devices 28. The execution of the virtual space may determine state of the virtual space. The state determined may correspond to a view for a user character being controlled by a user via the given user device 28. The state determined may correspond to a location in the virtual space. The view described by the state for the given user devices 28 may correspond, for example, to the location from which the view is taken, the location the view depicts and/or other locations, a zoom ratio, a dimensionality of objects, a point-of-view, and/or view parameters of the view. One or more of the view parameters may be selectable by the user.

The instance of the virtual space may comprise a simulated space that is accessible to users on the user devices 28 that present the views of the virtual space to the users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the space module 32 may be synchronous, asynchronous, and/or semi-synchronous. In some instances, the virtual space may include virtual space content as described herein, and/or other considerations of virtual space content.

The above description of the manner in which state of the virtual space is determined by space module 32 is not intended to be limiting. The space module 32 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 32, the user may control characters, objects, simulated physical phenomena (e.g., wind, rain, earthquakes, and/or other phenomena), and/or other elements within the virtual space to interact with the virtual space and/or other users. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

In some implementations the space module 32 may be attributed with less functionality than described herein. In some implementations the functionality of the space module 32 as described herein may instead be attributed to a remote server configured to host the virtual space. In some implementations, the space module 32 may be configured to receive views of the virtual space which are communicated from a remote server, such as server 12. In some implementations, the server (e.g., server 12) may be configured to implement the instance of the virtual space executed by the server to determine the state of the virtual space. The state may then be communicated (e.g., via streaming visual data, via object/position data, and/or other state information) from the server 12 to the user devices 28 for presentation to the users. Manners in which the server 12 may be configured to execute an instance of the virtual space and facilitate participation of users in the virtual space are described in more detail herein.

The content creation module 34 may be configured to receive entry and/or selection of commands from the users on the user devices 28. User devices 28 may be configured to facilitate (e.g., via content creation module 34) display of a user interface capable of receiving user entry and/or selections of commands related to generating content. For example, the user devices 28 may be configured to display to the user an instance of the virtual space. The displayed virtual space may be "blank" such that the virtual space which does not include any virtual objects and/or content. Users may make selections of content and/or enter commands to customize the virtual space. User selections and/or entry of commands may be facilitated in a variety of ways. The displayed user interface may include drop down windows, check boxes, arrangements of icons, and/or other display elements which represent virtual objects and/or other virtual content which are available to be arranged within the virtual space by the user. The users may be able to provide input into the user devices 28 corresponding to the selection, placement, and/or arrangement of one or more virtual objects within the virtual space, and/or other content. In some implementations, the content creation module 34 may be configured to provide virtual space templates. Virtual space templates may correspond to instances of the virtual space which include some or few virtual objects and/or other content arranged in predetermined positions and/or other predetermined content. The content creation module 34 may be configured to allow user to further customize the virtual space templates to create custom virtual spaces.

The selections received by the content creation module 34 may be used to configure corresponding user-generated virtual space content in the virtual space to be experienced by the user in the virtual space on the user devices 28. In some implementations, user-generated virtual space content comprises user selections of customized arrangement of virtual objects in the virtual space, and/or other selections of content. In some implementations, the corresponding user-generated content is configured locally at the user devices 28. In some implementations, the corresponding user-generated content may be configured at a remote server (e.g., the commands are communicated to the remote server such that the server may configure the content accordingly). Virtual objects in the virtual space may be virtual objects as described herein, and/or other considerations.

In some implementations, user-generated virtual space content may comprise user entry and/or selections corresponding to the customization of AI controlled objects, systems, and/or elements to be instantiated within the virtual space. AI control may refer to AI control as described herein, and/or other considerations.

In some implementations, user-generated virtual space content may comprise user entry and/or selections corresponding to the customization of game metrics to make one or more games available to be played in the virtual space. Game metrics associated with one or more games available to be played in the virtual space may be game metrics as described previously herein, and/or other considerations. In some implementations, user-generated virtual space content may comprise user entry and/or selections corresponding to the customization of logic associated with one or more games and/or the virtual space in general.

In some implementations, the user-generated content may include metadata associated with the content. The content creation module 34 may be configured to receive input of information from the user related to metadata associated with the user-generated content. Metadata may include information such as a name given to the content by the user (e.g., "Bob's Raceway"), a description about the content (e.g., "A ten lap race consisting of 3 hairpin turns!"), an image depicting a view of the content (e.g., a screenshot depicting the starting line of a simulated race track), and/or other information associated with the user-generated content.

Figure 2:
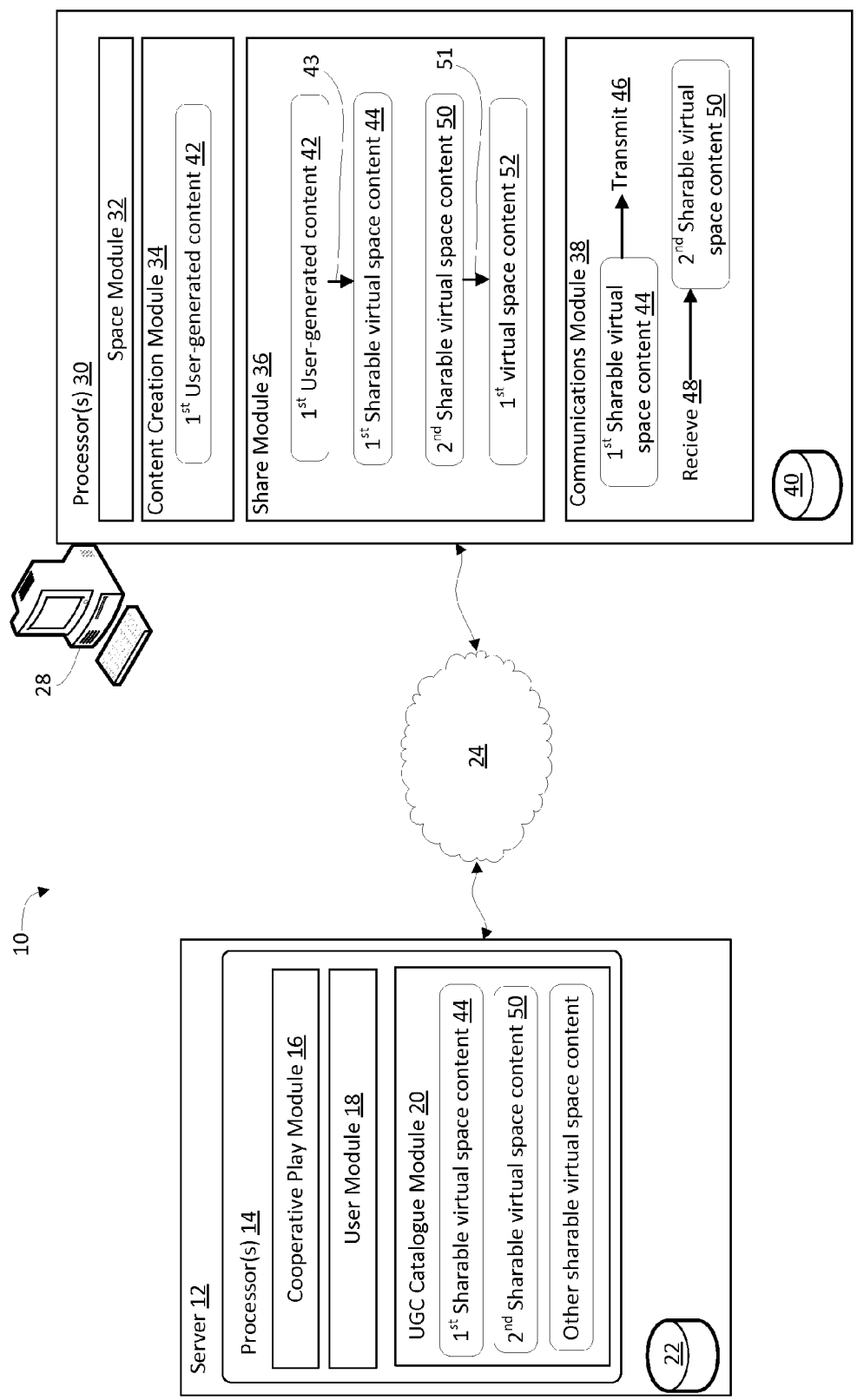
FIG. 2 illustrates in more detail a depiction of a user device of a first platform type and a server hosting a virtual space used in the system of FIG. 1.

For example, in FIG. 2, the content creation module 34 may be configured to receive selections from a user on a first user device 28 to configure corresponding first user-generated content 42 for implementation on the first user device 28. Configuring the content for implementation on the first user device 28 may comprise configuring the content in a format which is capable of implementation on the user device 28 so that the user can experience the content. As an illustrative example, the first user device 28 may be an XBOX 360, and the content creation module 34 may configure the first user-generated content 42 in a format which is capable of being implemented on XBOX type gaming platforms (e.g., the first platform type of the first user device 28). For example the format may be an executable program file which is specific to the user device 28 platform.

Returning to FIG. 1, the share module 36 may be configured to convert the user-generated virtual space content configured on the user device 28 (or configured on the server 12 in a format specific to the user device 28) by the content creation module 34 to sharable virtual space content. By converting the user-generated content to content configured for sharing, user-generated content configured on a user device of a particular platform type (or configured on the server in the platform specific format and converted to the sharable format on the server) may then be shared and experienced by users of other user devices which operate different platform types. As such sharable virtual space content may be content which is readable to implement the corresponding user-generated virtual space content on user devices which are different than the user device used to initially configure the user-generated content.

In some implementations, converting the user-generated virtual space content to the sharable virtual space content may include converting the format of the user-generated virtual space content to one or more different sharable formats. The format of the user device configured user-generated content may be of a format specific to the platform type of the user device. The sharable format may be a format which is readable by user devices 28 of any platform type (e.g., a 'generic' format). For example, the conversion may include converting the platform specific format to an open standard data format. This may include, for example, a text-based format like JavaScript Object Notation (JSON) format and/or other formats. JSON format conversion may be used for serializing the platform specific format for transmitting the structured data over a network communication (e.g., for communication to and from the server 12). Conversion may be accomplished by any suitable data conversion technique. Other considerations for sharable formats which one skilled in the art may deem suitable for the intended purpose are also contemplated. In some implementations, the converted content may be compressed using suitable file compression techniques. For example, the sharable user-generated content may be a JSON data file which is compressed using GZIP and/or other suitable file compression technique.

For example, in FIG. 2, the share module 36 may be configured to convert 43 the first user-generated content 42 to first sharable virtual space content 44. The first sharable virtual space content 44 may be readable to implement the first user-generated content 42 on a second user device (not shown) of a second platform type, wherein the second platform type may be different than the first platform type of the first user device 28.

Returning to FIG. 1, in some implementations, the share module 36 may be configured to convert sharable virtual space content to platform specific virtual space content which is configured to be implemented on the respective user devices 28. Converting the sharable virtual space content to virtual space content configured to be implemented on the users devices 28 may include converting the format of the sharable virtual space content to a platform specific format which is configured to be implemented on user device 28 of the respective platform type. For example, conversion from a sharable virtual space content format to a platform specific format may include, decompressing the compressed sharable format data files, and then converting the decompressed sharable data format to the platform specific format (e.g., converting from JSON to a format readable by an XBOX platform, or other platform). The process for converting sharable virtual space content to platform specific content may be the opposite of the procedure used to convert user-generated content to sharable virtual space content as described herein. The share module 36 may be configured to convert sharable virtual space content which is received by the communications module 38 to virtual space content specific to a user device platform. This may facilitate reception of user selected sharable virtual space content (e.g., selected from the server 12) and conversion into the underlying user-generated virtual space content without regard for the platform type and/or format used during the original generation of the content.

For example, in FIG. 2, the share module 36 may be configured to convert 51 second sharable virtual space content 50 to first virtual space content 52 which is configured to be implemented on the first user device 28 to be experienced by the user in the virtual space. The second sharable virtual space content 50 may be content which is communicated from the server 12 and received by the communications module 38.

Returning to FIG. 1, in some implementations, the some or all of the features described herein for the content creation module 34 and share module 36 may be attributed to the server 12. In such implementations, user selections and/or entry of commands for customizing virtual spaces may be communicated to the remote server 12 such that the user-generated content can be configured for implementation in a format specific to the user device of the user who created the content. Conversion of the user-generated content to and from platform specific format and sharable format as described herein may also be carried out by the server 12. Those skilled in the art will appreciate any modifications to the system 10 described herein as needed to carry out these and other implementations.

The communications module 38 may be configured to transmit sharable virtual space content which was locally converted from user-generated content by the share module 36 to a remote server, such as server 12. The communications module 38 may be configured to transmit the sharable virtual space content over a network (e.g., network 24), such as the Internet. In some implementations, the communications module 38 may be configured such that transmitting sharable virtual space content additionally comprises transmitting metadata associated with the sharable virtual space content along with the sharable virtual space content. Metadata may include information input by the user as described herein. Metadata may include information such as the file size of the sharable virtual space content. Metadata may include information such as the file size of the user-generated content which the sharable virtual space content was converted from. Metadata may include other information.

In some implementations, the communications module 38 may be further configured to receive sharable virtual space content sent from the server 12. Briefly, however described in more detail later herein, the server 12 may be configured to manage sharable virtual space content communicated from user devices 28 where users have created the user-generated content for sharing with other users of the virtual space. The communications module 38 may be configured to receive the shared virtual space content sent from the server 12 responsive to user input on the user devices 28 requesting access to the sharable virtual space content. Users may request sharable virtual space content by accessing the server 12, described in more detail below.

For example, in FIG. 2, the communications module 38 may be configured to transmit 46 the first sharable virtual space content 44 which was converted from the first user-generated content 42 by the share module 36, to a remote server, such as server 12. The communications module 38 may be configured to receive 48 second sharable virtual space content 50, which was transmitted from the remote server, to the first user device 28. The transmission of the second sharable virtual space content 50 to the first user device 28 may be based on selections by the users of the first user device 28 requesting access to the user-generated content associated with the second sharable virtual space content 50.

Returning to FIG. 1, in some implementations, the system 10 may include a server configured to host the virtual space, such as server 12. The server 12 may be configured to communicate with one or more user devices 28 according to client/server architecture. In some implementations, the server 12 may be a game server. The users may access the virtual space via user devices 28.

The server 12 may include one or more processors, such as processor 14, configured to execute one or more computer program modules. The computer program modules may include one or more of a cooperative play module 16, a user module 18, a user-generated content catalogue module 20 (abbreviated as "UGC Catalogue Module 20" in the figure), and/or other modules.

In some implementations, server 12 may be attributed with the some or all of the functionality for executing an instance of the virtual space to effectuate display of the virtual space on the user devices and to facilitate interaction of the users with the virtual space, as described herein.

The cooperative play module 16 may be configured to facilitate user participation in the virtual space. Participation may be accomplished by passing state information between the user devices 28 to facilitate maintenance of the virtual space in the same (or substantially the same, accounting for latency) state. In some implementations, cooperative play module 16 may execute an instance of the virtual space which reflects control inputs input by users to the user devices 28. This instance may be used to update and/or inform local expressions of the virtual space maintained locally at the user devices 28. The users may interact with each other through communications exchanged within the virtual space. Such communications may include one or more of textual chat, instant messages, private messages, voice communications, and/or other communications. Communications may be received and entered by the users via their respective user devices 28. Communications may be routed to and from the appropriate users through server 12 (e.g., through cooperative play module 16).

The cooperative play module 16 may be configured to facilitate cooperative online play (e.g., online multi-player gameplay) for users accessing the server 12 to play games which are available within the virtual space. For example, users may access the server 12 to play games made available through the sharable virtual space content created by other users and transmitted to the sever 12. The cooperative play module 16 may be configured such that cooperative online play is only made available to multiple users if the users employ user devices of the same platform type (e.g., configured to execute content of the same platform specific format).

The user module 18 may be configured to access and/or manage one or more user accounts and/or user information associated with users of the system 10. The one or more user accounts and/or user information may include information stored by server 12, one or more of the user devices 28, and/or other storage locations. The user accounts may include, for example, information associated with the users (e.g., a username or handle, a number, an identifier, and/or other identifying information) within the virtual environment, security login information (e.g., a login code or password), virtual space account information, subscription information, virtual currency account information (e.g., related to currency held in credit for a user), relationship information (e.g., information related to relationships between users and user 'friends' in the virtual environment), virtual environment usage information, gameplay mode usage information, demographic information associated with users, interaction history among users in the virtual environment, information stated by users, browsing history of users, a user identification associated with a user, a phone number associated with a user, and/or other information related to users. The user module 18 may be configured to manage other information.

The user-generated content catalogue module 20 may be configured to maintain a catalogue of the available sharable virtual space content. The catalogue may be organized into, and/or include, an index of the metadata associated with the sharable virtual space content which has been communicated to the server 12 (e.g., from user creating user-generated content on user devices 28). The users may access the server 12 (e.g., user-generated content catalogue module 20) such that the server 12 may present views of a user interface depicting the catalogue of the metadata associated with the sharable virtual space content which has been transmitted to the server 12 and made available for access. For example, the users may be presented with views of the screenshots associated with the individual sharable virtual space content, the names of the individual sharable virtual space content, the descriptions of the individual sharable virtual space content, and/or other information. Users may access the user-generated content catalogue module 20 of the server 12 (e.g., via user devices 28 through network 24) and select the sharable virtual space content they wish to implement on their respective user device 28 so that they can experience the corresponding user-generated virtual space content on their user device 28. The sharable virtual space content may be of a format readable by user devices 28 of any platform type, such that the user devices 28 can obtain the sharable virtual space content from the server 12 and then convert the sharable virtual space content to virtual space content configured for implementation on their respective user device 28. The conversion of the sharable virtual space content may then facilitate user interaction in the virtual space content in the virtual space.

In some implementations, the user-generated content catalogue module 20 may be configured to moderate the communication of sharable virtual space from user devices 28 to the server 12. Moderation may include reviewing the sharable virtual space content for appropriateness, completeness, and/or other considerations to subsequently allow or deny the content from being published on the server 12 (e.g., organized, indexed, and/or otherwise made accessible via the user-generated content catalogue module 20 for viewing of the related metadata by users accessing the server 12). Moderation may be considered in other ways.

As an illustrative example in FIG. 2, the user-generated content catalogue module 20 may be configured to maintain a catalogue of the available first sharable virtual space content 44, second sharable virtual space content 50, and/or other sharable virtual space content. The user-generated content catalogue module 20 may be configured to maintain an index of the metadata associated with the first sharable virtual space content 44, second sharable virtual space content 50, and/or other sharable virtual space content.

Returning to FIG. 1, the server 12, user devices 28, and/or external resources 26 may be operatively linked via one or more electronic communication links. For example, such electronic communication links may be established, at least in part, via a network 24 such as the Internet and/or other networks. It will be appreciated that this is not intended to be limiting, and that the scope of this disclosure includes implementations in which servers 12, user devices 28, and/or external resources 26 may be operatively linked via some other communication media.

The external resources 26 may include sources of information, hosts and/or providers of virtual environments outside of system 10, external entities participating with system 10, and/or other resources. In some implementations, some or all of the functionality attributed herein to external resources 26 may be provided by resources included in system 10.

The server 12 may include electronic storage 22, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

The user devices 28 may include electronic storage 40, one or more processors 30, and/or other components. The user devices 28 may include communication lines, or ports to enable the exchange of information with a network and/or other computing platforms. Illustration of user devices 28 in FIG. 1 is not intended to be limiting. The user devices 28 may include a plurality of hardware, software, and/or firmware components operating together to provide the functionality attributed herein to user devices 28.

Electronic storage 22, 40 may comprise electronic storage media that electronically stores information. The electronic storage media of electronic storage 22, 40 may include one or both of system storage that is provided integrally (i.e., substantially non-removable) with server 12 and user devices 28 and/or removable storage that is removably connectable to server 12 and user devices 28 via, for example, a port (e.g., a USB port, a firewire port, etc.) or a drive (e.g., a disk drive, etc.). Electronic storage 22, 40 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 22, 40 may include one or more virtual storage resources (e.g., cloud storage, a virtual private network, and/or other virtual storage resources). Electronic storage 22, 40 may store software algorithms, information determined by processors 14, 30 respectively, information received from server 12, information received from user devices 28, and/or other information that enables server 12, user devices 28 to function as described herein.

Processor(s) 14 may be configured to provide information processing capabilities in server 12. As such, processors 14 may include one or more of a digital processor, an analog processor, a digital circuit designed to process information, an analog circuit designed to process information, a state machine, and/or other mechanisms for electronically processing information. Although processor 14 is shown in FIG. 1 as single entities, this is for illustrative purposes only. In some implementations, processor 14 may include one or more processing units. These processing units may be physically located within the same device, or processor 14 may represent processing functionality of a plurality of devices operating in coordination. The processor 14 may be configured to execute modules 16, 18, 20. Processor 14 may be configured to execute modules 16, 18, 20 by software; hardware; firmware; some combination of software, hardware, and/or firmware; and/or other mechanisms for configuring processing capabilities on processor 14.

Processor(s) 30 may be configured to provide information processing capabilities in user devices 28. As such, processor 30 may include one or more of a digital processor, an analog processor, a digital circuit designed to process information, an analog circuit designed to process information, a state machine, and/or other mechanisms for electronically processing information. Although processor 30 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 30 may be configured to execute modules 32, 34, 36, 38. Processor 30 may be configured to execute modules 32, 34, 36, 38 by software; hardware; firmware; some combination of software, hardware, and/or firmware; and/or other mechanisms for configuring processing capabilities on processor 30.

It should be appreciated that although modules 16, 18, 20 and 32, 34, 36, 38 are illustrated in FIG. 1 as being co-located within the respective single processing units, in implementations in which processors 14 and 30 includes multiple processing units, one or more of modules 16, 18, 20 and 32, 34, 36, 38 may be located remotely from the other modules. The description of the functionality provided by the different modules 16, 18, 20 and 32, 34, 36, 38 described above is for illustrative purposes, and is not intended to be limiting, as any of modules 16, 18, 20 and 32, 34, 36, 38 may provide more or less functionality than is described. For example, one or more of modules 16, 18, and/or 20 may be eliminated, and some or all of its functionality may be provided by other ones of modules 16, 18, 20, and/or other modules.

Figure 3:
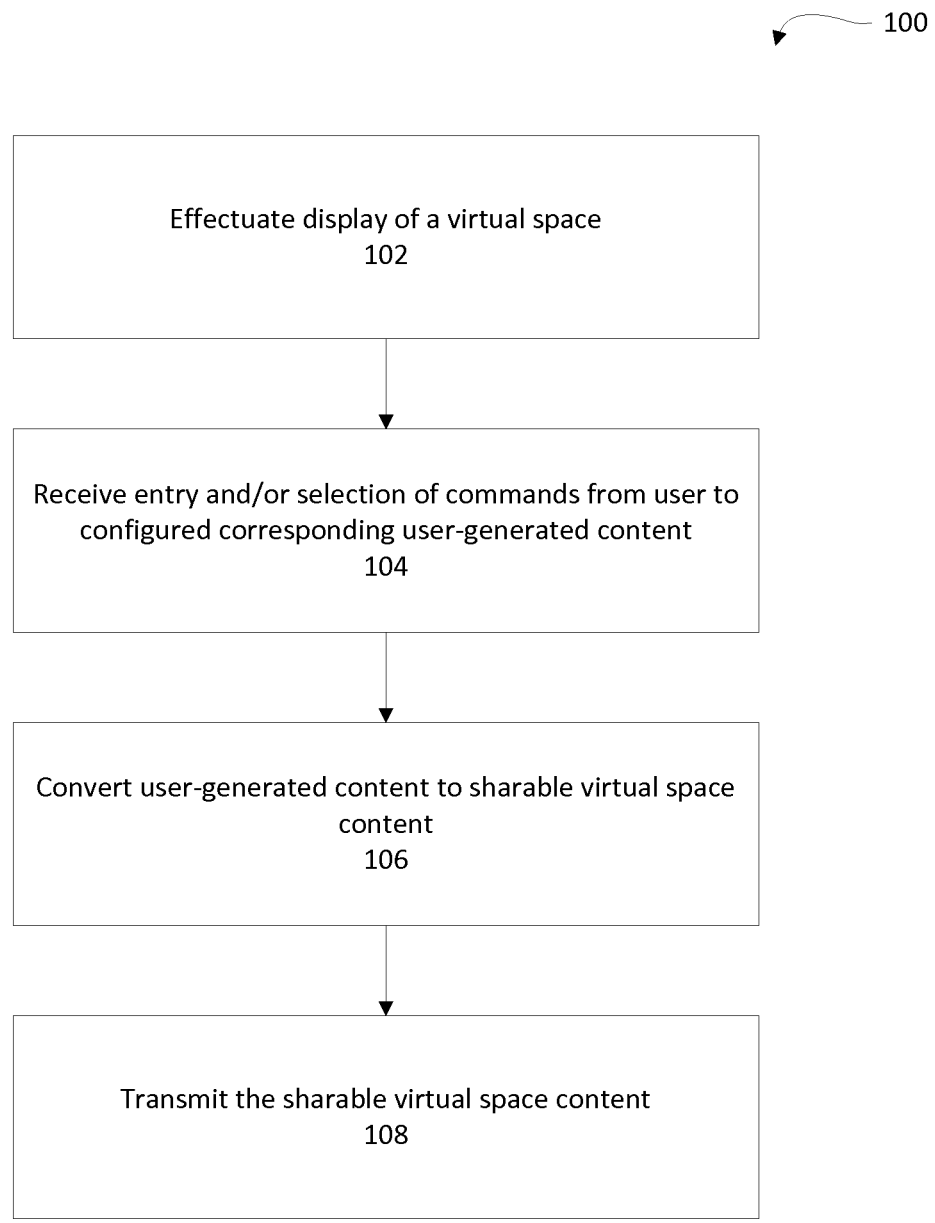
FIG. 3 illustrates a method for sharing user-generated content between computing platforms employed by users of a virtual space.

FIG. 3 illustrates a method 100 for cross platform sharing of user-generated content. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3 and described below are not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 3, at an operation 102 a display of a virtual space is effectuated on a user device. An instance of the virtual space may be an instance which is executed locally on the user device. An instance of the virtual space may be an instance which is executed remotely by a host server. In some implementations, operation 102 may be performed by a space module the same as or similar to space module 32 (shown in FIG. 1 and described herein).

At an operation 104, the user device receives entry and/or selections of commands from a user of the user device to configure corresponding user-generated content. In some implementations, operation 104 may be performed by a content creation module the same as or similar to the content creation module 34 (shown in FIG. 1 and described herein).

At an operation 106, the user-generated content is converted to sharable virtual space content. In some implementations, operation 106 may be performed by a share module the same as or similar to share module 36 (shown in FIG. 1 and described herein).

At an operation 108, the sharable virtual space content is transmitted to a remote server. In some implementations, operation 108 may be performed by communications module the same as or similar to communications module 38 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for sharing user-generated content between users of a virtual space, the system comprising:
    a first user device of a first platform type comprising:
        one or more processors configured by machine-readable instructions to:
            effectuate display of an instance of a virtual space on the first user device, and facilitate interaction of a user of the first user device with the instance of the virtual space, the virtual space comprising a simulated environment having a topography;
            receive entry and/or selection of commands from the user to configure corresponding user-generated virtual space content in the instance of the virtual space to be experienced by the user in the instance of the virtual space on the first user device, the user-generated virtual space content including one or more virtual objects positioned within the topography that are capable of locomotion within the topography, the commands from the user corresponding to an arrangement of the one or more virtual objects within the topography, the user-generated virtual space content being defined by first information being of a first format, the first format being specific to the first platform type such that the user-generated virtual space content defined by the first information is configured specifically for implementation on user devices of the first platform type;
            convert the first information that defines the user-generated virtual space content to second information that defines the user-generated virtual space content by serializing the first information, the second information being of a second format, the second format being a structured-data format, the conversion further comprising compressing the second information, the second format being platform type agnostic such that the second information is readable by other user devices of other platform types to facilitate implementing the user-generated virtual space content in other instances of the virtual space, the other user devices including a second user device of a second platform type, wherein the second platform type is different than the first platform type; and
            effectuate transmission of the second information from the first user device to a remote server; and
    the second user device of the second platform type, the second user device comprising:
        a second set of one or more processors configured by machine-readable instructions to:
            obtain, from the server, the second information that defines the user-generated virtual space content;
            convert the second information that defines the user-generated virtual space content to third information that defines the user-generated virtual space content by deserializing the second information, the third information being of a third format, the third format being specific to the second platform type such that the user-generated virtual space content defined by the third information is configured specifically for implementation on user devices of the second platform type; and
            effectuate display of a second instance of the virtual space on the second user device using the third information, the second instance of the virtual space comprising the user-generated virtual space content, and facilitate interaction of a second user of the second user device with the user-generated virtual space content in the second instance of the virtual space.

2. The system of claim 1, wherein the user-generated virtual space content further includes one or more games available to be played in the virtual space.

3. The system of claim 2, wherein the one or more processors of the first user device are further configured by machine-readable instructions such that the user-generated virtual space content includes game metrics associated with the one or more available games.

4. The system of claim 3, wherein the one or more processors of the first user device are further configured by machine-readable instructions such that the commands from the user correspond to customization of the game metrics associated with the one or more games.

5. The system of claim 4, wherein the one or more processors of the first user device are further configured by machine-readable instructions such that game metrics include one or more of the virtual objects arranged in the game or game rules.

6. The system of claim 1, wherein the one or more processors of the first user device are further configured by machine-readable instructions to:
   obtain fourth information that defines second user-generated virtual space content from the remote server, the second user-generated virtual space content being configured on a third user device of the second platform type, wherein the fourth information is of the second format such that the fourth information is readable by user devices of the first platform type to facilitate implementing the second user-generated virtual space content in instances of the virtual space; and
   convert the fourth information that defines the second user-generated virtual space content to fifth information that defines the second user-generated virtual space content, the fifth information being of the first format such that the second user-generated virtual space content defined by the fifth information is configured to be implemented on the first user device and to be experienced by the user in the instance of the virtual space.

7. The system of claim 6, wherein configuring the second user-generated virtual space content on the third user device comprising defining the second user-generated virtual space content by sixth information, the sixth information being of a third format, the third format being specific to the second platform type such that the second user-generated content defined by the sixth information is configured specifically for implementation on user devices of the second platform type, and wherein the fourth information is determined based on a conversion of the sixth information from the third format to the second format.

8. The system of claim 1, wherein the one or more processors of the first user device are further configured by machine-readable instructions such that transmitting the second information further comprising transmitting metadata associated with the user-generated virtual space content.

9. The system of claim 8, wherein the one or more processors of the first user device are further configured by machine-readable instructions such that metadata comprises one or more of a name associated the user-generated virtual space content, a description of the user-generated virtual space content, a file size of the second information, or an image of a view of the user-generated virtual space content.

10. The system of claim 1, wherein the user-generated virtual space content includes the one or more virtual objects arranged in the virtual space in a specific manner.

11. A method for sharing user-generated content between users of a virtual space, the method being implemented on a user device of a first platform type and a second user device of a second platform type, the user device including one or more physical processors and storage media storing machine-readable instructions, the method comprising:
   effectuating display of an instance of a virtual space on the user device, and facilitating interaction of a user of the user device with the instance of the virtual space, the virtual space comprising a simulated environment having a topography;
   receiving entry and/or selection of commands from the user to configure corresponding user-generated virtual space content in the instance of the virtual space to be experienced by the user in the instance of the virtual space on the first user device, the user-generated virtual space content including one or more virtual objects positioned within the topography that are capable of locomotion within the topography, the commands from the user corresponding to an arrangement of the one or more virtual objects within the topography, the user-generated virtual space content being defined by first information being of a first format, the first format being specific to the first platform type such that the user-generated virtual space content defined by the first information is configured specifically for implementation on user devices of the first platform type;
   converting the first information that defines the user-generated virtual space content to second information that defines the user-generated virtual space content by serializing the first information, the second information being of a second format, the second format being a structured-data format, the conversion further comprising compressing the second information, the second format being platform type agnostic such that the second information is readable other user devices of other platform types to facilitate implementing the user-generated virtual space content in other instances of the virtual space, the other user devices including the second user device of the second platform type, wherein the second platform type is different than the first platform type;
   effectuating transmission of the second information from the user device to a remote server;
   obtaining, by the second user device, the second information that defines the user-generated virtual space content from the remote server;
   converting, by the second user device, the second information that defines the user-generated virtual space content to third information that defines the user-generated virtual space content by deserializing the second information, the third information being of a third format, the third format being specific to the second platform type such that the user-generated virtual space content defined by the third information is configured specifically for implementation on user devices of the second platform type; and
   effectuating, by the second user device, display of a second instance of the virtual space on the second user device using the third information, the second instance of the virtual space comprising the user-generated virtual space content, and facilitate interaction of a second user of the second user device with the user-generated virtual space content in the second instance of the virtual space.

12. The method of claim 11, wherein the user-generated virtual space content further includes one or more games available to be played in the virtual space.

13. The method of claim 12, wherein the user-generated virtual space content includes game metrics associated with the one or more available games.

14. The method of claim 13, wherein the commands correspond to the customization of the game metrics associated with the one or more games.

15. The method of claim 13, wherein the game metrics include one or both of virtual objects arranged in the game or game rules.

16. The method of claim 11, further comprising:
obtaining fourth information that defines second user-generated virtual space content from the remote server, the second user-generated virtual space content being configured on a third user device of the second platform type, wherein the fourth information is of the second format such that the fourth information is readable by user devices of the first platform type to facilitate implementing the second user-generated virtual space content in instances of the virtual space; and
converting the fourth information that defines the second user-generated virtual space content to fifth information that defines the second user-generated virtual space content, the fifth information being of the first format such that the second user-generated virtual space content defined by the fifth information configured to be implemented on the first user device and to be experienced by the first user in the instance of the virtual space.

17. The method of claim 16, wherein configuring the second user-generated virtual space content on the third user device comprising defining the second user-generated virtual space content by sixth information, the sixth information being of a third format, the third format being specific to the second platform type such that the second user-generated content defined by the sixth information is configured specifically for implementation on user devices of the second platform type, and wherein the fourth information is determined based on a conversion of the sixth information from the third format to the second format.

18. The method of claim 11, wherein transmitting the second information further comprises transmitting metadata associated with the user-generated virtual space content.

19. The method of claim 18, wherein the metadata comprises one or more of a name associated the user-generated virtual space content, a description of the user-generated virtual space content, a file size of the second information, or an image of a view of the user-generated virtual space content.

20. The method of claim 11, wherein the user-generated virtual space content includes the one or more virtual objects arranged in the virtual space in a specific manner.

* * * * *